United States Patent [19]

Iwase et al.

[11] Patent Number: 4,538,172
[45] Date of Patent: Aug. 27, 1985

[54] ANALOG TO DIGITAL CONVERTING SYSTEM FOR COMPOSITE VIDEO SIGNAL

[75] Inventors: Seiichiro Iwase, Sagamihara; Shinichi Komori, Isehara, both of Japan

[73] Assignee: Sony Corporation, Tokyo, Japan

[21] Appl. No.: 504,739

[22] Filed: Jun. 16, 1983

[30] Foreign Application Priority Data

Jun. 17, 1982 [JP] Japan .................................. 57-104329

[51] Int. Cl.³ ............................................ H04N 9/46
[52] U.S. Cl. ...................................... 358/13; 375/120
[58] Field of Search .................... 358/13, 19; 375/120; 340/347 SH

[56] References Cited

U.S. PATENT DOCUMENTS

| | | | |
|---|---|---|---|
| 4,054,904 | 10/1977 | Saitoh et al. | 358/19 |
| 4,212,027 | 7/1980 | Lemoine | 358/19 |
| 4,291,332 | 9/1981 | Kato et al. | 358/19 |

Primary Examiner—John W. Shepperd
Attorney, Agent, or Firm—Lewis H. Eslinger; Alvin Sinderbrand

[57] ABSTRACT

An analog to digital converting system for a video signal is disclosed in which an analog video signal is fed to an analog to digital converter, then converted to a digital video signal, a digital burst signal is extracted from the digital video signal thus converted, the digital burst signal is multiplied by first and second AC signals having the same frequency as the burst frequency but different in phase to each other to produce first and second digital product signals, first and second digital signals representing DC components are derived from the first and second digital product signals, and the first and second digital signals are calculated to thereby control the phase of the sampling clock at the analog to digital converter.

6 Claims, 2 Drawing Figures

ANALOG TO DIGITAL CONVERTING SYSTEM FOR COMPOSITE VIDEO SIGNAL

BACKGROUND OF THE INVENTION

1. Field of the Invention

The present invention relates generally to an analog to digital converting system for a video signal and is directed more particularly to an analog to digital converting system for a composite video signal.

2. Description of the Prior Art

When a composite video signal is analog to digital (A/D) converted, its sampling point must be the same position (phase) for a synchronizing pulse and a color subcarrier during any horizontal period. Therefore, in the prior art three points in one cycle of a burst signal are sampled and it is checked whether the three points are scheduled sampling points or not by the level of the sampled output. Then, based upon the checked result the sampling phase for the composite video signal is controlled.

According to the above method, however, since the number of the sampling outputs is small, the produced control signal contains much uncertain portions and also an error is large. Further, this method is effective for only such a case that the sampling frequency is an integer multiple of the color subcarrier frequency (burst frequency). For example, when the sampling frequency is 13.5 MHz which is not an integer multiple, an error is caused and hence the control for the sampling phase becomes unstable.

OBJECTS AND SUMMARY OF THE INVENTION

Accordingly, it is an object of the present invention to provide an analog to digital converting system for a video signal free from the defects inherent to the prior art.

It is another object of the invention to provide an A/D (analog to digital) converting system for converting an analog video signal to a digital video signal in which a sampling clock is synchronized with a burst signal in phase.

It is a yet another object of the invention to provide an A/D converting system for a composite video signal in which no matter what the frequency of the sampling clock is, its phase can be matched with the burst signal in phase.

According to an aspect of the present invention, there is provided an analog to digital converting system for a video signal which comprises:

an analog to digital converter having signal input, output and clock input terminals, an analog video signal being supplied to said signal input terminal and a sampling clock of a predetermined frequency being supplied to said clock input terminal so that a digital video signal is derived from said output terminal in response to said sampling clock;

a burst gate means for deriving therethrough a digital burst signal from said digital video signal;

a reference signal generator generating first and second digital reference signals;

at least two multipliers respectively multiplying said first and second digital reference signals by said digital burst signal;

DC component detecting means for detecting DC components from outputs delivered by said at least two multipliers;

a phase error calculating means for calculating a phase error of said digital burst signal by output from said DC component detecting means; and a phase shifter for controlling a phase of said sampling clock in response to the phase error which is the output from said phase error calculating means and supplying a sampling clock whose phase is corrected to said analog to digital converter.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 1:
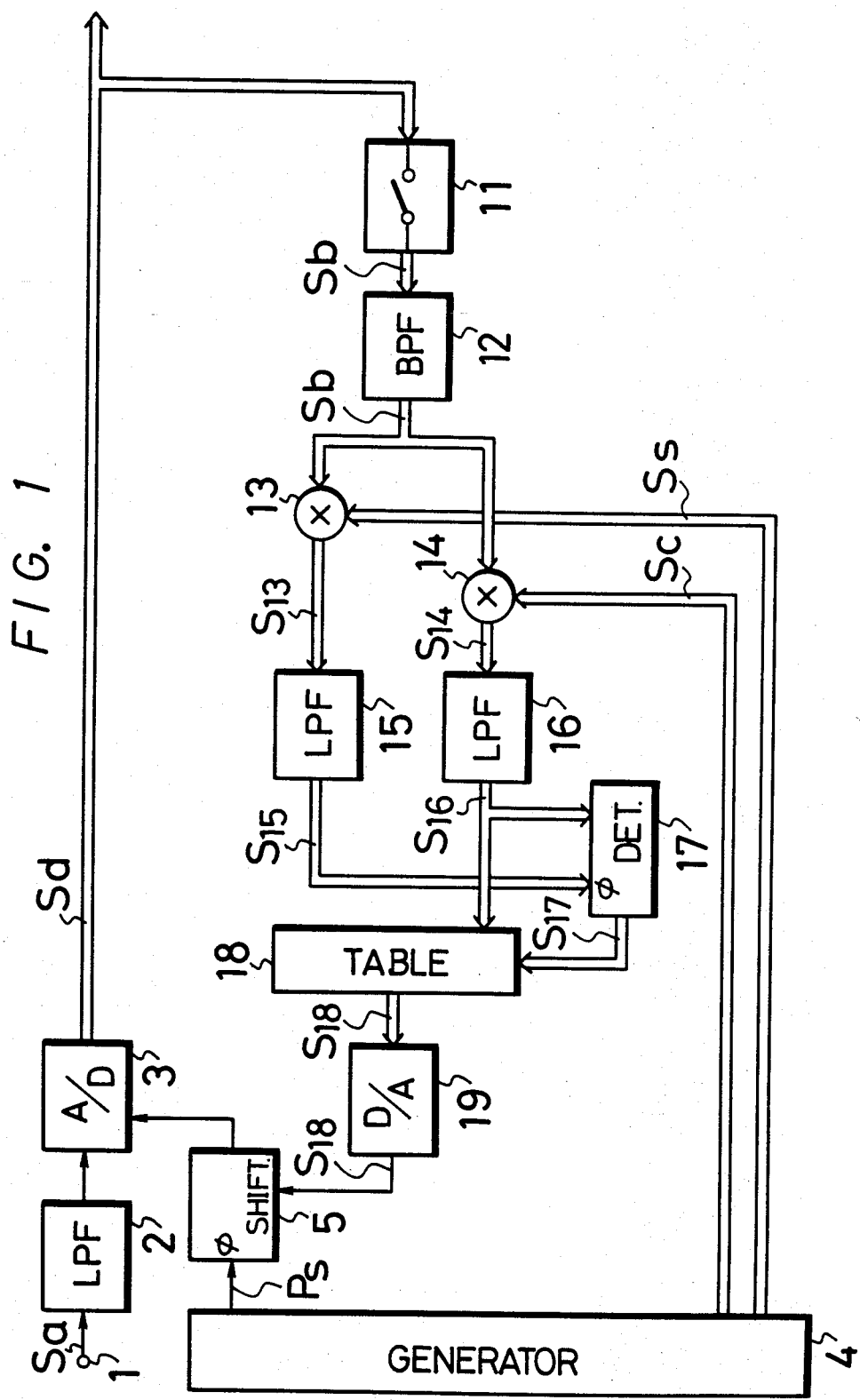
FIG. 1 is a block diagram schematically illustrating an embodiment of the A/D converting system for a video signal according to the present invention.

Before describing the present invention, the basic idea of the invention will be explained first.

For the better understanding, if a burst signal Sb is a continuous wave, the burst signal Sb can be expressed as follows:

$$Sb = \alpha \sin(\omega t + \beta)$$

where $\alpha$ is an amplitude;

$\omega$ is a color subcarrier frequency (angular frequency); and $\beta$ is a phase.

If two alternating (AC) signals Ss and Sc which are expressed as $Ss = \sin \omega t$ $Sc = \cos \omega t$ are considered and these signals Ss and Sc are respectively multiplied on the burst signal Sb, resultant product signals $S_{13}$ and $S_{14}$ become as follows:

$$S_{13} = Sb \cdot Ss$$
$$= \frac{1}{2} \alpha \{\cos \beta - \cos(2\omega t + \beta)\}$$

$$S_{14} = Sb \cdot Sc$$
$$= \frac{1}{2} \alpha \{\sin(2\omega t + \beta) + \sin \beta\}$$

Then, if direct current (DC) components $S_{15}$ and $S_{16}$ are respectively extracted from the signals $S_{13}$ and $S_{14}$, they are expressed as follows:

$S_{15} = \frac{1}{2} \alpha \cos \beta$ $S_{16} = \frac{1}{2} \alpha \sin \beta$ Accordingly, the following equation can be derived.

$$S_{16}/S_{15} = \sin \beta / \cos \beta \qquad (1)$$
$$= \tan \beta$$
$$\therefore \beta = \tan^{-1} S_{16}/S_{15}$$

Therefore, the phase $\beta$ of the burst signal Sb can be obtained from the DC components $S_{15}$ and $S_{16}$.

When the phase $\beta$ of the burst signal Sb is known, it is possible that the sampling phase for a video signal is controlled same for any horizontal period.

In this case, however, as to the division in the equation (1), such a case must be considered that its denominator is 0. If no consideration is paid, the hardware and software become complicated.

By the way, if it is possible that when the sampling frequency is four times as the color subcarrier frequency, the sampling phase is changed by 90° or shifted by one clock with respect to the burst signal Sb, this is equivalent in digital point of view to changing the sampling phase by 360° by shifting the data.

Therefore, the phase $\beta$ of the burst signal Sb is divided to four regions I to IV, each including the region of 90° as follows:

| | |
|---|---|
| $-45° \leq \beta \beta 45°$ | I |
| $45° \leq \beta \leq 135°$ | II |
| $-135° \leq \beta \leq -45°$ | III |
| $135° \leq \beta \leq 180°$ and $-180° \leq \beta \leq -135°$ | IV |

The above division or classification can be carried out irrespective of the amplitude $\alpha$ which will be clear from the sign and magnitude of the signals $S_{15}$ and $S_{16}$ in the equation (1).

In the case that the phase $\beta$ is contained in the region I, the phase $\beta$ is calculated from the signal $S_{16}$ by using the table and the control amount is outputted. When the phase $\beta$ is in the region II or III, the data of reference AC signal is delayed or advanced by one clock (one sampling pulse), while when the phase $\beta$ is in the region IV, the table is inverted or shifted by 180°.

By the above process, the phase $\beta$ of the following burst signal Sb is included in the region I and the control amount is delivered.

The phase of the sampling pulse is controlled by the control amount provided by the manner as set forth above.

Now, an example of the present invention, which will realize the above-mentioned idea and process, will be described hereinbelow with reference to the attached drawings.

In FIG. 1 which shows an example of the invention, an analog composite video signal Sa is supplied through an input terminal 1 to a low pass filter 2 which serves to remove unnecessary high frequency components, which will become an aliasing noise upon A/D conversion, from the signal Sa. The signal Sa from which the unnecessary components are removed is fed to an A/D converter 3. A generator 4 formed of, for example, a PLL (phase locked loop) produces a sampling pulse Ps with the frequency, for example, 4 times the color subcarrier frequency. This sampling pulse Ps is supplied through a phase shifter 5 to the A/D converter 3 so that the signal Sa is converted to a digital video signal Sd of, for example, 8-bits by the A/D converter 3.

This signal Sd is then fed to a burst gate circuit 11 from which the digital burst signal Sb is derived. This signal Sb is supplied to a digital filter 12 having a band pass characteristic in which a pedestal component contained in the burst signal Sb is removed therefrom. The burst signal Sb with no pedestal component is applied to multiplier circuits 13 and 14 which are also supplied with digital signals Ss and Sc from the generator 4. Thus, the digital signals $S_{13}$ and $S_{14}$ are derived from the multiplier circuits 13 and 14, respectively, and then supplied to digital filters 15 and 16, each having a low pass characteristic, from which the digital signals $S_{15}$ and $S_{16}$ are respectively derived.

The digital signals $S_{15}$ and $S_{16}$ are both fed to a discriminator or detector circuit 17 which then discriminates to which one of the regions I to IV the phase $\beta$ of the burst signal Sb belongs. A discriminated or detected output therefrom is supplied as a control signal $S_{17}$ to a table 18 to which also supplied is the signal $S_{16}$ as a conversion input. Thus, the table 18 delivers a digital signal $S_{18}$ representing the control amount and this signal $S_{18}$ is then applied to a D/A (digital to analog) converter 19 and converted thereby to an analog signal $S_{18}$. This analog signal $S_{18}$ is supplied to the phase shifter 5 as the control signal to thereby control the phase of the sampling pulse Ps within the range of $\pm 45°$, which is supplied to the A/D converter 3.

As described above, according to this invention, when the composite video signal Sa is A/D converted, its sampling phase can be restricted same in any horizontal period. Further, in such a case since, as will be clear from the afore-said equation (1), the phase $\beta$ of the burst signal Sb can be detected accurately, the control of the sampling phase can be performed accurately and is stable for time change. In addition, even when the sampling frequency is not an integer multiple of the color subcarrier frequency, the error is less.

Figure 2:
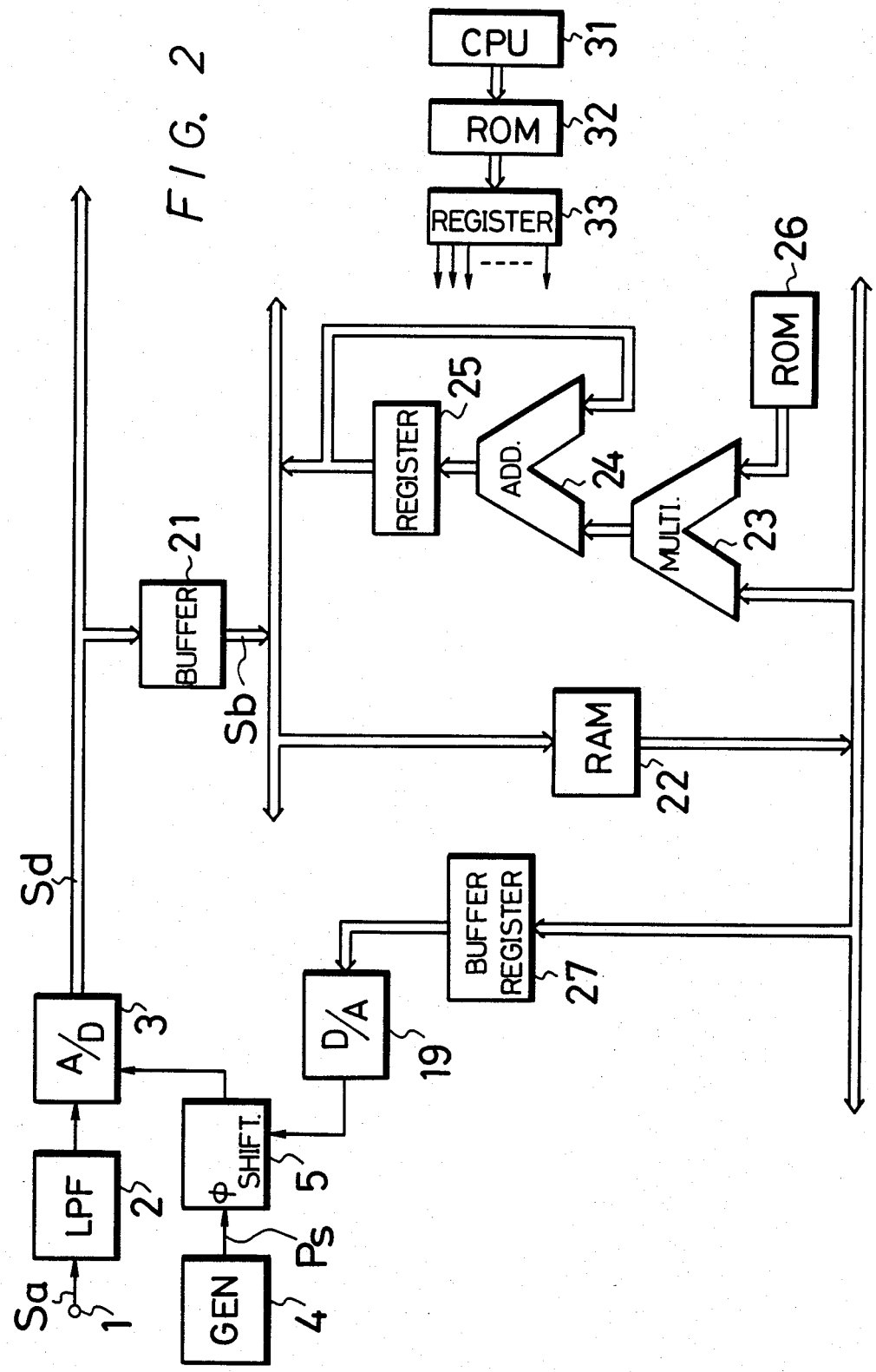
FIG. 2 is a function block diagram of another embodiment of the invention.

FIG. 2 shows another example of the present invention, in which the signal process carried out by the circuits 11 to 18 in the example of FIG. 1 is performed by microprogramming.

In general, even if a digital filter is of an IIR (infinite impulse response) type or FIR (finite impulse response) type, it can be formed of a delay circuit, a multiplier and an adding circuit or adder and it is possible to present a desired characteristic by selecting the stage number thereof and the multiplying factor (including code) at the multiplier and adding circuit. The above is of course applied to the filters 12, 15 and 16 shown in FIG. 1.

In the example of the invention shown in FIG. 2, the above-mentioned fact is utilized.

In FIG. 2, 21 represents a buffer register which serves, in correspondence with the burst gate circuit 11 shown in FIG. 1, to derive the burst signal Sb. Further, in FIG. 2, 22 designates a RAM (random access memory) to store the data, 23 a multiplier, 24 an adding circuit or adder, 25 a register, and 26 a ROM (read only memory) having stored therein the multiplying factor, the reference AC signal and the data of the table, respectively.

In the example of FIG. 2, there are further provided a micro-program controller (sequencer) 31, a micro-program memory 32 and a pipe-line register 33. In this case, the memory 32 is formed of a ROM in which written is the program for the circuit including the elements 21 to 27 to perform the sampling phase control. This program is loaded to the register 33 by the controller 31 to carry out the respective commands.

That is, when the burst period arrives, the burst signal Sb from the digital video signal Sd is loaded to the register 21 from which the burst signal Sb is derived. This signal is then transferred to the RAM 22. For this signal Sb the RAM 22 operates as a delay circuit, and in the multiplier 23 and the adder 24 the factor from the ROM 26 is multiplied and added. The calculated result therefrom is fed through the register 25 to the RAM 22 and then stored therein to realize the band pass filter 12 (refer to FIG. 1). In this case, the filter 12 is an FIR type band pass filter of 9th order as an example.

In the multiplier 23, the multiplications of the multipliers 13 and 14 (refer to FIG. 1) are also performed, and similar to the case of the filter 12, the low pass filters 15 and 16 (refer to FIG. 1) are realized, too. In this case, the filters 15 and 16 are each an FIR type low pass filter of 27th order.

The detecting circuit 17 (refer to FIG. 1) is formed by the multiplier 23 and the adder 24. The RAM 22 produces the output showing the phase $\beta$ of the burst signal Sb while using the data from the table of the ROM 26, and the output from the RAM 22 is supplied through the buffer register 27 to the D/A converter 19.

In this case, a certain burst signal Sb is used to control the sampling phase during the horizontal period including the next burst signal Sb, so that it is enough that the signal process by the circuit elements 21 to 27 is carried out within one horizontal period. Thus, there is sufficient time tolerance.

By this manner, according to the example of the invention shown in FIG. 2, the phase control process is achieved by the micro-programming.

In this case, since the main process is carried out by the software, the change, correction and so on of the characteristics of the filters 12, 15, 16 and the like are flexible and hence optimum characteristics can be easily obtained.

In the above description, the video signal Sa is a composite video signal. However, when the video signal is a component signal, it is sufficient that the channel of each color signal is constructed as set forth above.

The above description is given for preferred embodiments of the invention, but it will be apparent that many modifications and variations could be effected by one skilled in the art without departing from the spirit or scope of the invention, so that the scope of the invention should be determined by the appended claims.

We claim as our invention:

1. An analog to digital converting system for a video signal having a pedestal component, comprising:
    analog to digital converter means having a signal input terminal, a signal output terminal and a clock input terminal, an analog video signal being supplied to said signal input terminal and a sampling clock signal having a predetermined frequency being supplied to said clock input terminal so that said analog to digital converter means supplies a digital video signal from said output terminal in response to said sampling clock signal;
    filter means for filtering said pedestal component from said digital video signal to supply a filtered digital video signal;
    burst gate means for deriving a digital burst signal from said filtered digital video signal;
    reference signal generator means for generating first and second digital reference signals, each of said reference signals varying in time, and for generating a sampling clock signal;
    multiplier means for multiplying said first and second digital reference signals by said digital burst signal to produce first and secod multiplied signals;
    DC component detecting means for detecting DC components of said first and second multiplied signals to produce a detector signal therefrom;
    phase error calculating means for calculating a phase error of said digital burst signal in said detector signal from said DC component detecting means to produce a phase error signal in response thereto; and
    phase shifter means for controlling a phase of said sampling clock signal in response to said phase error signal and supplying a corrected sampling clock signal having a corrected phase to said clock input terminal of said analog to digital converter means.

2. An analog to digital converting system according to claim 1, wherein said analog video signal is a composite video signal.

3. An analog to digital converting system according to claim 1, wherein said analog video signal includes a color subcarrier signal, and wherein said sampling clock signal has a frequency selected to be 4 times the frequency of said color subcarrier signal.

4. An analog to digital converting system according to claim 1, wherein said reference signal generator includes a phase locked loop circuit.

5. An analog to digital converting system according to claim 1, wherein said multiplier means, said DC component detecting means, and said phase error calculating means comprise memory means for storing signals corresponding to micro-program instructions therein; and means for executing said signals corresponding to said micro-program instructions stored in said memory means.

6. An analog to digital converting system according to claim 5, wherein said means for executing includes register means for executing said signals corresponding to said micro-program instructions, and controller means for supplying said signals corresponding to micro-program instructions from said memory means to said register means.

* * * * *